UNITED STATES PATENT OFFICE.

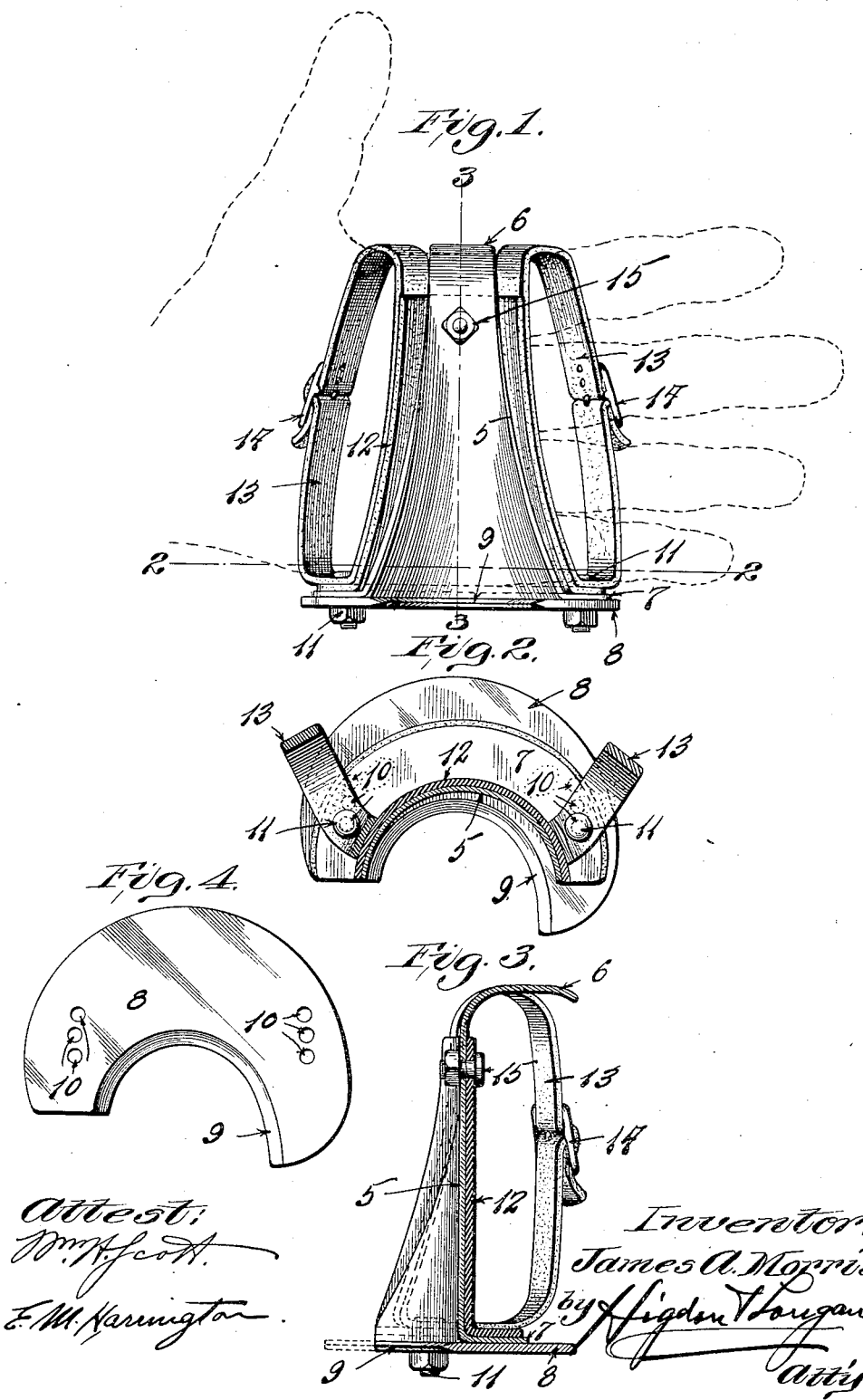

JAMES A. MORRIS, OF THOMAS, OKLAHOMA.

KNIFE FOR HEADING KAFIR CORN.

1,084,949.  Specification of Letters Patent.  Patented Jan. 20, 1914.

Application filed March 11, 1913. Serial No. 753,587.

*To all whom it may concern:*

Be it known that I, JAMES A. MORRIS, a citizen of the United States, and resident of Thomas, Custer county, Oklahoma, have invented certain new and useful Improvements in Knives for Heading Kafir Corn, of which the following is a specification containing a full, clear, and exact description, reference being had to the accompanying drawings, forming a part hereof.

My invention relates to improvements in knives for heading Kafir corn, and the object of my invention is to construct an improved implement which may be secured over the palm of the hand, and which carries a sharpened element at its lower end so that the hand may be free to grasp the heads of Kafir corn during the act of cutting or severing the heads from the stalks.

With the above purposes in view my invention consists in certain novel features of construction and arrangement of parts as will be hereinafter described, pointed out in the claims and illustrated by the accompanying drawings, in which—

Figure 1 is a front elevation of the complete implement; Fig. 2 is a sectional plan taken on the line 2—2 of Fig. 1; Fig. 3 is a vertical sectional elevation on the line 3—3 of Fig. 1; and Fig. 4 is a plan of one of the knives detached.

Referring by numerals to the accompanying drawings: 5 designates the body portion or handle of my improved implement, which handle is constructed of a single piece of material preferably sheet metal in the form of one-half of a bisected hollow cone and has at its upper end an integral rearwardly turned projection 6 and at its base an integral rearwardly turned flange 7.

8 designates the knife blade which is segmental in shape and has its forward edge 9 beveled and sharpened to form a cutting edge. Said blade is mounted beneath said flange 7 and is secured in position by means of suitable fastening devices. At approximately diametrically opposite points there are the series of perforations 10 which provide means together with the bolts 11 for securing the knife blade to the flange 7 of the handle.

12 designates a covering, preferably constructed of leather, which faces the rear of the handle 5 and the top of the flange 7 in order to protect the operator's hand. Secured to this cover 12 are the looped straps 13 carrying the buckles 14 which provide a means for adjusting them to different sized hands. This protector is secured to the implement by means of bolts 15 extended through the handle 5 and by the bolts 11.

It is to be observed that the knife blade 8 is longer on one side than on the other and is shaped something after the plan of an ordinary grass hook or sickle, in order that there will be a drawing cut of the knife blade through the corn in the act of grasping the head of the corn. It is to be observed further that the knife blade, by reason of its having a series of the openings 10 may be adjustable relative to the handle in order that this drawing cut may be varied.

In operation an implement of the type described may be secured to each of the operator's hands, which hands are both free to grasp the head of a stalk of Kafir corn and by a rapid tilting of the hand and implement move the knife blade through the stalk of Kafir beneath the head, thereby severing the head from the stalk and retaining it grasped firmly in the hand so that it may be deposited in a container carried for its reception.

I claim:

1. The improved Kafir corn knife, comprising a handle in the form of one-half of a bisected hollow cone, a flat segmental flange having bolt-openings and extending at a right angle rearwardly from the lower end of said handle, a flat segmental knife blade having bolt-openings and mounted beneath said flange, and bolts for engaging said openings.

2. The improved Kafir corn knife, comprising a handle in the form of one-half of a bisected hollow cone, a flat segmental flange having bolt-openings and extending at a right angle rearwardly from the lower end of said handle, a flat segmental knife blade having bolt-openings and mounted beneath said flange, bolts for engaging said openings, a cover on the exterior of the handle, and adjustable straps secured to the cover, substantially as shown and for the purposes stated.

In testimony whereof, I have signed my name to this specification, in presence of two subscribing witnesses.

JAMES A. MORRIS.

Witnesses:
 JOSEPH W. MORRIS,
 G. E. BURSON.

Copies of this patent may be obtained for five cents each, by addressing the "Commissioner of Patents, Washington, D. C."